(12) United States Patent
Botros

(10) Patent No.: US 6,894,115 B2
(45) Date of Patent: May 17, 2005

(54) DUAL-FUNCTIONALIZED ADHESIVE COMPOSITIONS

(75) Inventor: Maged G. Botros, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 25 days.

(21) Appl. No.: 10/321,232

(22) Filed: Dec. 17, 2002

(65) Prior Publication Data

US 2004/0116602 A1 Jun. 17, 2004

(51) Int. Cl.$^7$ .......................... C08L 83/16; C08F 30/08; C08C 11/25
(52) U.S. Cl. .......................... 525/101; 525/70; 525/72; 525/78; 525/80; 525/100; 525/106; 525/191; 525/221; 525/222; 525/326.5; 525/329.7; 525/330.3; 525/342; 525/479
(58) Field of Search .......................... 525/70, 72, 78, 525/80, 100, 101, 106, 191, 221, 222, 326.5, 329.7, 330.3, 342, 479

(56) References Cited

U.S. PATENT DOCUMENTS

| | | | |
|---|---|---|---|
| 4,087,587 A | | 5/1978 | Shida et al. |
| 4,198,327 A | * | 4/1980 | Matsumoto et al. .......... 525/73 |
| 4,298,712 A | | 11/1981 | Machonis et al. |
| 4,487,885 A | | 12/1984 | Adur et al. |
| 4,774,144 A | | 9/1988 | Jachec et al. |
| 5,266,627 A | | 11/1993 | Meverden et al. |
| 5,312,861 A | | 5/1994 | Meverden et al. |
| 5,367,022 A | | 11/1994 | Kiang et al. |
| 5,378,539 A | * | 1/1995 | Chen .......................... 428/378 |
| 5,461,110 A | * | 10/1995 | Arthurs et al. ................ 525/71 |
| 5,824,412 A | * | 10/1998 | Hausmann .................. 428/378 |
| 5,874,497 A | * | 2/1999 | Schellenbeck et al. ...... 524/504 |
| 5,883,144 A | * | 3/1999 | Bambara et al. ............ 521/144 |
| 6,455,637 B1 | * | 9/2002 | Jackson et al. ............. 525/191 |
| 6,545,091 B1 | * | 4/2003 | Lee et al. .................... 525/78 |

OTHER PUBLICATIONS

Ulren, L., et al.: "Adhesion between Aluminum and Copolymers of Ethylene and Vinyltrimethoxysilane," *J. of Applied Science*, vol. 37: 1269–1285 (1985).

Ross, J.F., et al.: "An Improved Gas–Phase Polypropylene Process," *Ind. Eng. Chem. Prod. Res. Dev.*, 24: 149–154 (1985).

Bullen, D.J.: "Crosslinking Reactions During Processing of Silane Modified Polyethylenes," *British Polymer Journal*, 21: 117–123 (1989).

Utsch, S., et al.: "Crosslinking of LLDPE and VLDPE via Graft–Polymerized Vinyltrimethoxysilane," *Plastics and Rubber Processings and Applications*, vol. 13; No. 2: 81–91 (1990).

Hjertberg, T., et al.: "Chemical Reactions in Crosslinking of Copolymers of Ethylene and Vinyltrimethoxy Silane," *J. of App. Polymer Science.*, vol. 42: 1185–1192 (1991).

Bullen, D.J.: "The Silane Crosslinking Behavior of Low Density Polyethylene Cable Compounds," Product Development Department, BXL Plastics, Ltd. (22 pages).

Panzer, L.: "Advances in Silane Crosslinking of Polyethylene," *ANTEC* 1998: pp. 1421–1424.

Liptak, P., et al.: "Moisture Crosslinking of Filled Ethylene–butyl Acryalte–Vinylsilane Terpolymer," *International Polymer Science and Technology*: vol. 19, No. 12: 82–86 (1992).

Venkatraman, S., et al.: "Properties of Three Types of Crosslinked Polyethylene," *Advances in Polymer Technology*: vol. 9, No. 3: 265–270 (1989).

Toynbee, J.: "Silane Crosslinking of Polyolefins: Observations on the Tin Catalyst Employed," *Polymer*: vol. 35, No. 2: 438–440 (1994).

Botros, M.G.: U.S. Appl. No. 10/299,282 "Adhesive Compositions Having Improved Performance"filed Nov. 19, 2002.

* cited by examiner

Primary Examiner—Jeffrey B. Robertson
(74) Attorney, Agent, or Firm—William A. Heidrich; Gerald A. Baracka

(57) ABSTRACT

Adhesive blend compositions having significantly improved adhesion to metals at elevated temperatures are provided. The compositions are blends of one or more polyolefin base resins, an acid or acid derivative modified polyolefin and silane modified polyolefin. A low level of adhesion promotor is optionally included in the blend.

24 Claims, No Drawings

DUAL-FUNCTIONALIZED ADHESIVE COMPOSITIONS

BACKGROUND OF THE INVENTION

1. Field of the Invention

The invention relates to adhesive compositions and, more specifically, to extrudable polyolefin-based adhesive compositions containing both acid (or acid derivative) functionality and silane functionality.

2. Description of the Prior Art

Adhesive blends, commonly referred to as tie layer adhesives, designed to improve adhesion between polyolefins and dissimilar substrates, such as polyamides and ethylene-vinyl alcohol (EVOH) copolymers, metals and the like, in multi-layer constructions are well known. These adhesive blends typically consist of a polyolefin base resin, which is the predominant component in the blend, and a modified polymer containing carboxylic acid or anhydride functionality, e.g., polymers grafted with maleic anhydride. Optionally, one or more other polymeric materials, including rubbers, are included in the adhesive blends. Representative adhesive blends of the above types are described in U.S. Pat. Nos. 4,087,587; 4,298,712; 4487885; 4774144; and 5367022.

While numerous tie-layer adhesive compositions have been developed, new formulations which extend the envelope of performance or meet the requirements of new laminate applications are always in demand. Tie-layer adhesives having improved adhesion, particularly at high temperatures, are especially desirable. High temperature conditions may occur as a result of the processing or manufacturing operations or the environment to which the finished article is exposed. Examples of the latter would be for multi-layer tubing for under-the-hood automotive applications where the lines can be exposed to high temperatures for extended periods and where adhesive compositions resistant to thermal degradation are therefore essential. Other applications where heat resistant tie-layer adhesives are necessary are for heat shrinkable multi-layer films used for cook-in applications. Still another application requiring good high temperature performance is for tubing for plumbing applications where the tubing can also undergo repeated heating and cooling cycles and the associated stresses resulting therefrom.

Composite polyolefin/metal pipe and tubing is extensively used for plumbing and heating systems. Polyethylene (PE) and crosslinked PE (PEX) and aluminum are most commonly used for these applications. These constructions typically would have the structure PEX/tie-layer/metal/tie-layer/PEX, PE/tie-layer/metal/tie-layer/PE or PE/tie-layer/metal/tie-layer/PEX. Even though the metal provides most of the mechanical strength in these constructions, mechanical integrity and pressure ratings are dependent on the quality of the bond between the metal and PE or PEX. It would be highly desirable if adhesive compositions having improved metal adhesion at elevated temperatures were available for these applications.

Ethylene copolymers containing vinyl silane comonomers, either grafted or copolymerized, are known. The presence of silane functionality in the polymers is a recognized means of obtaining crosslinkable compositions which are useful for a variety of applications. Silane crosslinkable polyolefins are widely used as insulation materials for low voltage power cables. Vinyltrimethoxysilane (VTMOS) and vinyltriethoxysilane (VTEOS) are the most commonly used silanes for copolymerization with ethylene or for grafting onto polyethylene backbones.

Copolymers of ethylene and VTMOS and terpolymers of ethylene, butyl acrylate and VTMOS have also been shown to exhibit good adhesion to aluminum. L. Ulren et al (Journal of Applied Polymer Science, Vol. 37, 1269–1285 (1989)) have shown that the introduction of silane groups in the polymer chain of polyethylene improves adhesion.

In copending application Ser. No. 10/299,282, filed Nov. 19, 2002 now U.S. Pat. No. 6,835,777, the use of organic bases, carboxylic acids and organometallic compounds are added to polyolefin-based adhesive blends to improve adhesion.

SUMMARY OF THE INVENTION

Adhesive compositions having improved metal adhesion at elevated temperatures are now provided. The improved compositions are blends of a polyolefin base resin, a graft modified polyolefin and a silane modified polyolefin. Low levels of adhesion promotor may also be advantageously included in the adhesive blends. The incorporation of the adhesion promotor significantly increases adhesion at temperatures as high as 120° C.

More specifically the improved adhesive blend compositions of the invention are comprised of (a) 65 to 95.5 weight percent (wt. %) polyolefin base resin having a melt index of 0.1 to 100 g/10 min; (b) 2.5 to 25 wt. % modified polyolefin grafted with 0.5 to 4 wt. % ethylenically unsaturated carboxylic acid or acid derivative; and (c) 2 to 20 wt. % silane modified ethylene polymer wherein the silane comonomer is either copolymerized or grafted.

Highly useful compositions are obtained when the base resin is selected from the group consisting of ethylene homopolymers; copolymers of ethylene with $C_{3-8}$ α-olefins, vinyl carboxylates and alkyl acrylates; terpolymers of ethylene and propylene with diene monomers; polyisobutylene; and copolymers of isobutylene and isoprene. Preferred modified polyolefins are HDPE and LLDPE grafted with maleic anhydride. Preferred silane modified polymers are polyethylenes grafted with vinyltrimethoxysilane or vinyltriethoxysilane, ethylene-vinyltrimethoxysilane copolymers or ethylene-vinyltriethoxysilane copolymers. In a particularly useful embodiment, an adhesion promotor is included in the adhesive blends. Preferred adhesion promotors are carboxylates of metals selected from the group consisting of lead, cobalt, iron, nickel, zinc and tin. Dibutyltin dilaurate is an especially useful adhesion promotor.

In another highly useful embodiment, the base resin is a mixture of a highly crystalline polyolefin resin and elastomeric polyolefin resin present at a weight ratio of from 15:1 to 1:1. Base resins comprised of mixtures of polyethylene resins with EPR, EPDM or polyisobutylene provide particularly good adhesion to aluminum at high temperatures especially when adhesion promotors are employed.

DETAILED DESCRIPTION

The present invention provides adhesive compositions useful for a variety of applications but particularly well suited for adhering polyolefins to metal substrates. The adhesive compositions of the invention also provide superior performance in high temperature and barrier applications. One particularly useful application is to adhere polyolefin substrates and metals, such as aluminum, copper and stainless steel. The adhesives are even more advantageously employed for the construction of polyolefin/metal composite pressure pipe for water applications and heating systems which undergo repeated thermal cycles. Composite polyolefin/metal pipes produced using the improved adhesives of the invention exhibit enhanced resistance to delamination at the metal-polyolefin interface.

The adhesives of the invention are blends of a base resin and two different functionalized polyolefins. More specifically, the base resin is comprised of one or more polyolefins and the functionalized polyolefin components are a polyolefin modified by having ethylenically unsaturated carboxylic acid or acid derivative functionality grafted to the polymer backbone and a silane modified polyolefin. Modified polyolefins of both types are known. As used herein, the term grafting denotes covalent bonding of a grafting monomer to the polymer chain.

Polyolefins useful for the base resin include ethylene homopolymers; copolymers of ethylene with $C_{3-8}$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include low density polyethylene (LDPE); medium density polyethylene (MDPE); HDPE; LLDPE; so-called very low density polyethylene (VLDPE); so-called ultra low density polyethylene (ULDPE); ethylene-vinyl acetate (EVA) copolymers; ethylene-acrylate copolymers such as ethylene-ethyl acrylate copolymer and ethylene-n-butylacrylate copolymers; and blends thereof. The base resins (or resin blend will generally have a melt index (MI) from 0.1 to 100 g/10 min. determined in accordance with ASTM D 1238, Condition E.

Highly useful adhesive blends are obtained when the base resin is a mixture of a highly crystalline polyolefin and an elastomeric polyolefin. As used herein, the terms "rubber," "elastomer" or "elastomeric" refers to products having rubber-like properties and little or no crystallinity. If the base resin is comprised of both crystalline and amorphous polymers, the weight ratio of crystalline to rubbery polymers is from 15:1 to 1:1 and, more preferably, 10:1 to 1.5:1.

Useful ethylene copolymer rubbers can include ethylene-vinyl acetate copolymers, ethylene-alkyl acrylate copolymers, and ethylene-α-olefin copolymers. These rubbery copolymers will generally have melt indexes from 0.1 to 100 g/10 min. and, more preferably, from 0.2 to 10 g/10 min. Densities will typically range from 0.850 to 0.980 g/cm. Useful vinyl-acetate copolymers will generally contain from 8% to 60% vinyl acetate and, more preferably, from 10% to 50% vinyl acetate. The ethylene-alkyl acrylate copolymers will generally have from 1% to 50% and, more preferably, from 5% to 50% alkyl acrylate copolymerized. Ethylene-ethyl acrylate and ethylene-n-butyl acrylate copolymers are particularly useful elastomeric polymers of the latter type.

Ethylene-propylene rubber (EPR) and ethylene-propylene-diene rubber (EPDM) are highly useful elastomeric components for the compositions of the invention. These elastomers typically contain greater than 50 wt. % ethylene and, in one highly useful embodiment of the invention, an EPR or EPDM containing 60% or more ethylene is utilized. Products of this type are obtained by conventional polymerization procedures known to the art and include the so-called metallocene rubbers.

Illustrative elastomers of the above type and which are available from commercial sources include BUNA EPT 2070 (22 Mooney ML(1+4)125° C., 69% ethylene), BUNA EPT 2370 (16 Mooney, 3% ethylidene norbornene, 72% ethylene), BUNA 2460 (21 Mooney, 4% ethylidene norbornene, 62% ethylene), KELTAN EPDM DE244 (Mooney 55, 71% ethylene, 0.2% ethylidene norbornene) and ENGAGE 8100 (23 Mooney (ML(1+4)121° C.) or ENGAGE 8200 with 8 Mooney The polyolefin(s) comprising the base resin can be the same or different than the polyolefins used for the functionalized components. The base resin will have an MI from 0.1 to 100 g/10 min.

Still other elastomeric products can be included in the base resin. These include, for example, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

In one highly useful embodiment where the base resin comprises both crystalline and elastomeric resin components, the crystalline resin is polyethylene and the elastomeric resin is EPR, EPDM or polyisobutylene. The polyethylene can be HDPE, LDPE, LLDPE, MDPE, VLDPE, ULDPE or mixtures thereof.

The functionalized polyolefin component which is grafted with an unsaturated carboxylic acid or derivative may be prepared in solution, in a fluidized bed reactor, by melt grafting or irradiation grafting. Highly useful grafted polyolefins for the invention are conveniently prepared by reacting the polyolefin in the substantial absence of a solvent. This can be accomplished in a shear-imparting reactor, such as an extruder/reactor. Twin screw extruder/reactors such as those marketed by Coperion (formerly Werner-Pfleiderer) under the designations ZSK-53, ZSK-83 and ZSK-92 are commonly used. A free radical generating catalyst, such as a peroxide catalyst, can be employed but is not necessary.

The grafting reaction is carried at a temperature selected to minimize or avoid rapid vaporization and consequent losses of the graft monomer and any catalyst that may be employed. The graft monomer concentration is typically about 1 to about 5 wt. % based on the total reaction mixture weight. A temperature profile where the temperature of the polyolefin melt increases gradually through the length of the extruder/reactor up to a maximum in the grafting reaction zone and then decreases toward the reactor exit is preferred. Temperature attenuation is desirable for product pelletizing purposes. The maximum temperature within the reactor should be such that significant vaporization losses and/or premature decomposition of any peroxide catalyst are avoided. For example, with di-t-butyl peroxide and 2,5-dimethyl-2,5-di-(t-butylperoxy) hexane, maximum temperatures within the reactor should be maintained at or below about 220° C. Examples of useful peroxide catalysts include: 1,1-bis(t-butylperoxy)cyclohexane; n-butyl-4,4-bis(t-butylperoxyvalerate); 1,1-bis(t-butylperoxy)-3,3,5-trimethylcyclohexane; 2,2-bis(t-butylperoxy)butane; dicumylperoxide; t-butylcumylperoxide; α,α'-bis(t-butylperoxypreoxy-isopropyl)benzene; di-t-butylperoxide; 2,5-dimethyl-2,5-di(t-butylperoxy) hexane; and the like. Since substantial amounts of solvent are to be avoided, the grafting monomer and any catalyst used are preferably added in neat form to the extruder/reactor.

Ethylenically unsaturated carboxylic acids or acid derivatives, such as acid anhydrides, esters, salts or the like which can be grafted include but are not limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride(XMNA). Maleic anhydride (MAH) is a preferred grafting monomer.

Functionalized polyolefins grafted in accordance with the above procedures can include homopolymers and copolymers of ethylene and propylene or mixtures thereof. Particularly useful are ethylene homopolymers, copolymers of ethylene with $C_{3-8}$ α-olefins, propylene homopolymers and propylene-ethylene copolymers, including random propylene-ethylene copolymers, block copolymers of propylene and ethylene and the so-called impact ethylene-copolymers. The latter resins are intimate mixtures comprised of a continuous crystalline phase (propylene homopolymer) having an amorphous or rubbery phase (ethylene-propylene copolymer) dispersed therein. While impact copolymers can be produced by physically blending the individual polymer components, they are most commonly produced in gas-phase, stirred-bed polymerization processes which utilize two reactors connected in series and using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers. Gas phase polymerizations of this type are described in the article by Ross, et al., entitled "An Improved Gas-Phase Polypropylene Process" in *Ind. Eng. Chem. Prod. Res. Dev.* 1985, 24, 149–154, which is incorporated herein by reference.

Graft monomer contents, i.e., the amount of unsaturated acid or acid derivative reacted with the polypropylene, generally range from about 0.5 up to about 4 weight percent (wt. %). Highly useful modified polyolefins for the invention have from 1 to 3 wt. % graft monomer reacted. In a particularly useful embodiment of the invention the functionalized polyolefin is polyethylene grafted with MAH. High density polyethylene (HDPE) having a density of 0.94 g/cm$^3$ or above and linear low density polyethylene (LLDPE) having a density up to 0.939 g/cm$^3$ grafted with MAH are especially useful functionalized polyolefins. The MI of the MAH grafted component will typically range from 0.5 to 50 g/10 min.

In addition to the above-described functionalized polyolefin component which is modified by grafting with an unsaturated carboxylic acid or acid derivative, the improved adhesive blends of the invention also contain a second functionalized polyolefin component. This second component is a silane modified polyolefin and, more specifically, an ethylene polymer having silane functionality either incorporated into the polymer chain by copolymerization or attached to the polymer chain by grafting.

Silanes used for the grafting and copolymerization modification procedures are vinyltrialkoxysilanes of the formula $H_2C=CH-Si-(OR)_3$ where R is a $C_{1-4}$ alkyl group. Vinyltrimethoxysilane, i.e., where R is a methyl group and vinyltriethoxysilane, where R is an ethyl group, are especially useful. Ethylene polymers obtained by grafting unsaturated alkoxysilanes to ethylene polymers are disclosed in U.S. Pat. No. 3,646,155 which is incorporated herein by reference. Polymers obtained by copolymerizing ethylene with unsaturated alkoxysilanes are disclosed in U.S. Pat. Nos. 3,225,018 and 3,392,156, which are incorporated herein by reference. The amount of vinylalkoxysilane incorporated can range from 0.1 to 20 wt. % and, more preferably, will be in the range 0.5 to 7.5 wt. %. The silane functionalized components can have a MIs from 0.1 to 50 g/10 min.; however, MIs preferably range from 1 to 40 g/10 min.

When the silane modified component is obtained by copolymerization, one or more other olefinic monomers may also be present with the ethylene and vinyltrialkoxysilane. α-Olefin comonomers are especially useful. When present, these comonomers may constitute up to 20 wt. % of the copolymer but are more preferably present in amounts less than 10 percent. Illustrative comonomers which can be copolymerized with the ethylene and vinyltrialkoxysilane include: α-olefins such as propylene, butene, hexene and octene; vinyl esters such as vinyl acetate and vinyl butyrate; carboxylic acids and their esters such as methacrylic acid, acrylic acid, methyl acrylate and methyl methacrylate; vinyl ethers such as methyl vinyl ether; acrylonitrile; and the like.

Grafted silane modified components are ethylene homopolymers and copolymers, such as LDPE, LLDPE, MDPE, HDPE, VLDPE and ULDPE, grafted with a vinylalkoxysilane. HDPE grafted with vinyltrimethoxysilane or vinyltriethoxysilane are particularly useful graft functionalized silane components.

The improved adhesive compositions of the invention are prepared by melt mixing the base with the two functionalized components and any optional components or additives using conventional mixing methods. The base resin, which typically constitutes the major constituent of the blend, can comprise a single polyolefin or, as is more commonly the case, a combination of two or more polyolefins can be used. The base resin(s) will constitute 65 to 95.5 wt. % and, more preferably, 75 to 92 wt. % of the adhesive blend. The acid or acid derivative grafted polyolefin component will be present from 2.5 to 25 wt. % and, more preferably 4 to 20 wt. %. The silane functionalized component will comprise from 2 to 20 wt. % and, more preferably, 4 to 12 wt. % of the adhesive blend.

For the melt mixing operation the components can be combined i.e., dry blended, and added to a Banbury mixer or extruder where they are melt blended or they can be added individually. Adhesive blends produced in this manner can be pelletized and stored in a relatively low humidity environment for subsequent use or they can be directly extruded during manufacture of the finished article. Another approach useful in extrusion processes is to feed separate feeds of different components into the extruder during the coextrusion operation. In this latter procedure one or both of the functionalized polyolefins and optional additives may be utilized in masterbatch form, i.e., combined with one or more base resin components. Masterbatch techniques are also advantageously utilized with other procedures since this facilitates addition of low levels of optional additives and insures uniform distribution of these additives in the adhesive blend with minimal processing.

For most applications the adhesive blends will also contain one or more stabilizing agents, such as antioxidants, thermal stabilizers, UV inhibitors and the like. The type and amount of these stabilizing agents will depend on the end use application. These additives and others may be added as the components are being melt blended or pre-incorporated with one or more of the components before the final blending operation, for example, in a masterbatch.

In a highly useful embodiment of the invention to produce adhesive compositions having significantly improved adhesion at elevated temperatures, one or more adhesion promoters are added to the adhesive blend, i.e., combined with the base resin and functionalized polyolefin components. Useful promoters include organic bases, carboxylic acids and organometallic compounds including organic titanates and complexes or carboxylates of lead, cobalt, iron, nickel, zinc and tin such as dibutyltin dilaurate, dioctyltin maleate, dibutyltin diacetate, dibutyltin dioctoate, stannous acetate, stannous octoate, lead naphthenate, zinc caprylate, cobalt haphthenate and the like. Tin carboxylates, especially dibutyltin dilaurate (DBTDL) and dioctyltin maleate, are particularly effective promotors for the adhesive blends of the invention. While compounds of these types are used as condensation catalysts and are known to promote crosslinking for silane modified wire and cable insulation, their function in the adhesive blends of the invention is believed to be more complex and, for this reason, they are referred to as adhesion promoters.

The adhesion promotor is employed at a concentration of 50 to 10000 parts per million (ppm) of the adhesive blend. The concentration of adhesion promotor in the adhesive blend is preferably 100 to 3000 ppm.

The adhesive blends of the invention may be utilized for a variety of bonding applications involving bonding plastic, wood, glass, paper, composite and metal substrates. They can be used in lamination, extrusion and coextrusion, sheet extrusion/coextrusion, extrusion/coextrusion lamination, extrusion/coextrusion coating, injection blow molding, melt thermoforming and the like.

In one highly useful application, the adhesive blends are used to bond polyolefins and metals such as aluminum, stainless steel, copper and the like. They are particularly well suited for use as tie layers for polyolefin/metal composite pipes. These are multi-layer constructions, most typically, five-layer composites of polyolefin/adhesive/metal/adhesive/polyolefin. Pipe constructions of this type are used for a wide variety of heating and plumbing applications including, for example, hot and cold potable water installations, radiant floor heating systems, snow and ice melting systems for walks and driveways, compressed air supply lines, radiator connections and industrial and sanitary applications.

For most composite pressure pipe constructions, the metal is aluminum and the polyolefin is polyethylene, and to a lesser extent, polypropylene. A specific five-layer construction of the above type would be PE/adhesive/aluminum/adhesive/PE. The polyethylene may be crosslinked, utilizing known technology such as thermal or moisture cure (with or without a catalyst) or irradiation cure, to enhance physical properties—particularly high temperature and high pressure resistance. Commonly the inner polyethylene layer is crosslinked and the outer layer is conventional uncrosslinked high density polyethylene. Constructions of these latter types would be represented PEX/adhesive/aluminum/adhesive/PEX and PE/adhesive/aluminum/adhesive/PEX, respectively. The PEX can be any of the conventional crosslinked polyethylenes used for this purpose and designated within the industry as PEX-a, PEX-b and PEX-c. Composite pressure pipes of the above types are commercially available, in different sizes and designated for different uses, under the tradenames UNIPIPE, AQUAPEX, ALUPEX, MEPLA, ALPEXTHERM, KITEC and MULTYGOL.

The following examples illustrate the invention. Those skilled in the art will recognize many variations that are within the spirit of the invention and scope of the claims.

The following adhesive blends (A–H) were prepared in accordance with the invention and evaluated for their adhesion to aluminum:

Adhesive Blend A contained 78.1 wt. % base resin comprised of LLDPE, HDPE and EPR and 21.9 wt. % of two different functionalized ethylene polymers. Compositional details were as follows:

| | |
|---|---|
| 51.8 wt. % | LLDPE (density 0.915 g/cm$^3$; MI 1.0 g/10 min.) |
| 21.3 wt. % | EPR 65 wt. % ethylene; Mooney viscosity ML (1 + 8) @ 100° C. 30) |
| 5 wt. % | HDPE (density 0.9540 g/cm$^3$; MI 1.0 g/10 min.) |
| 11.9 wt. % | HDPE grafted with about 2 wt. % maleic anhydride (MI 9 g/10 min) |
| 10 wt. % | HDPE grafted with about 1 wt. % VTMOS (MI 35 g/10 min.) |

Adhesive Blend B contained 83.2 wt. % base resin comprised of a mixture of HDPE and polyisobutylene and 16.8 wt. % of anhydride functionalized and silane functionalized ethylene polymers. Details of the composition were as follows:

| | |
|---|---|
| 67 wt. % | HDPE (density 0.9545 g/cm$^3$; MI 18 g/10 min.) |
| 16.2 wt. % | polyisobutylene rubber (viscosity average MW 750,000–1,050,000 (Flory); intrinsic viscosity 2.07–2.57 dl/g) |
| 6.8 wt. % | MAH grafted HDPE of Blend A |
| 10 wt. % | VTMOS grafted HDPE of Blend A |

Adhesive Blend C was the same as that of Blend A except that the silane functionalized component was a copolymer of ethylene and VTMOS (1.7 wt. % VTMOS; density 0.9225 g/cm$^3$; MI 1.5 g/10 min.).

Adhesive Blend D was the same as that of Blend B except that the silane functionalized component was a copolymer of ethylene and VTMOS (1.7 wt. % VTMOS; density 0.9225 g/cm3; MI 1.5 g/10 min.

Adhesive Blend E was comprised of 82.4 wt. % base resin and 17.6 wt. % functionalized polyolefins. The blend components were the same as used for Blend A. Weight percentages of the blend components were 54.9% LLDPE, 22.5% EPR, 5% HDPE, 12.6% MAH grafted HDPE and 5% VTMOS grafted HDPE.

Adhesive Blend F contained 87.8 wt. % base resin and 12.2 wt. % functionalized polyolefins. The blend components used were the same as used for Blend B. Weight percentages of the blend components were 70.7% HDPE, 17.1% polyisobutylene rubber, 7.2% MAH grafted HDPE and 5% VTMOS grafted HDPE.

Adhesive Blend G was the same as that of Blend E except that the silane functionalized component was a copolymer of ethylene and VTMOS (1.7 wt. % VTMOS; density 0.922 g/cm$^3$; MI 1.5 g/10 min).

Adhesive Blend H was the same as that of Blend F except that the silane functionalized component was a ethylene-VTMOS copolymer (1.7 wt. % VTMOS; density 0.9225 g/cm$^3$; MI 1.5 g/10 min).

Each of the above adhesive blends (A–H) contained 3500–4000 ppm hindered phenol stabilizer. Blends A, B, E and F also contained 600 ppm DBTDL and Blends C, D, G and H had 700 ppm DBTDL. The blends were prepared by melt blending in a twin screw extruder having a temperature profile from 170° C. to 240° C.

To demonstrate the improved adhesion properties obtained with the compositions of the invention, each of the above identified Blends A–H were evaluated for adhesion to aluminum using a simulated ring peel adhesion test. Laminates were prepared by pressing a 12 mil film of the adhesive blend between two sheets of 0.2 mm. aluminum (Reynolds pipe grade 3001 Al) at 420° F. This was accomplished by preheating in a press at 2000–4000 pounds for 5 minutes, increasing the pressure to 40000 pounds for 30 seconds and cooling while maintaining the pressure. One centimeter wide samples were then cut from the laminated sheets, mounted in the ring peel fixture and pulled in an Instron tester at a rate of 10 inches/minute. Test results reported are the average of five pulls.

For comparative purposes, four blends designated as Comparative Blends I–L, were prepared. For the comparative blends, however, the functionalized silane component was omitted and the amount of base resin proportionately increased. The comparative blends also contained no adhesion promotor. The comparative blends were evaluated for adhesion to aluminum using the above-described simulated ring pull test.

To demonstrate the ability of the adhesive blends of the invention to provide adhesion at elevated temperatures, samples were tested for adhesion at 23° C. (ambient conditions) and at 120° C. Also, some of the samples were exposed to hot water, i.e., immersed in 95° C. water for 4 hours, before adhesion testing. Results obtained for the adhesive blends under the various test conditions are set forth in Tables I–IV. Adhesion values are in Newtons/centimeter (N/cm).

TABLE I

| | Adhesion | | |
|---|---|---|---|
| Test Temperature (° C.) | Blend A | Blend E | Comparative Blend I |
| 23° C. | 66.1 | 112.1 | 91.8 |
| 23° C.[1] | 91.8 | 112.4 | 93.5 |
| 120° C. | 18.5 | 14.9 | 5.1 |
| 120° C.[1] | 17 | 22.3 | 13.7 |

[1]Samples immersed in 95° C. water for 4 hours prior to adhesion testing.

TABLE II

| | Adhesion | | |
|---|---|---|---|
| Test Temperature (° C.) | Blend B | Blend F | Comparative Blend J |
| 23° C. | 104 | 91.3 | 63.9 |
| 23° C.[1] | 85.2 | 87.2 | 62.8 |
| 120° C. | 24.9 | 30.7 | 4.0 |
| 120° C.[1] | 16.2 | 20.0 | 10.2 |

[1]Samples immersed in 95° C. water for 4 hours prior to adhesion testing.

TABLE III

| | Adhesion | | |
|---|---|---|---|
| Test Temperature (° C.) | Blend C | Blend G | Comparative Blend K |
| 23° C. | 117.6 | 94.8 | 91.8 |
| 23° C.[1] | N.D. | 126.3 | 94.2 |
| 120° C. | 12.2 | 12.1 | 5.1 |

[1]Samples immersed in 95° C. water for 4 hours prior to adhesion testing.
N.D = not determined

TABLE IV

| | Adhesion | | |
|---|---|---|---|
| Test Temperature (° C.) | Blend D | Blend H | Comparative Blend L |
| 23° C.[1] | N.D. | 75.4 | 63.9 |
| 120° C. | 10.6 | 7.5 | 4.0 |

[1]Samples immersed in 95° C. water for 4 hours prior to adhesion testing.
N.D. = not determined The marked increase in high temperature adhesion to aluminum obtained with the adhesive blends of the invention over the comparative blends is apparent from the data. While better adhesion was obtained with Comparative Blend I at ambient conditions (compared to inventive Blend A), in all other tests carried out at ambient temperature and 120° C., superior adhesion was obtained with the adhesive blends of the invention containing both MAH and silane functionalized polyolefins and adhesion promotor. In fact, in one of the 120° C. adhesion tests, Adhesive Blends B and F, had more than 500% increase in 120° C. adhesion over Comparative Blend J.

I claim:
1. An adhesive composition comprising:
 (a) 65 to 95.5 wt. % polyolefin base resin having a melt index of 0.1 to 100 g/10 min. and selected from the group consisting of ethylene homopolymers, copolymers of ethylene with $C_{3-8}$ α-olefins, vinyl carboxylates and alkyl acrylates, terpolymers of ethylene and propylene with diene monomers, polyisobutylene, and copolymers of isobutylene and isoprene;
 (b) 2.5 to 25 wt. % modified polyolefin grafted with 0.5 to 4 wt. % ethylenically unsaturated carboxylic acid or acid derivative and having a melt index from 0.5 to 50 g/10 min; and
 (c) 2 to 20 wt. % modified ethylene polymer having from 0.1 to 20 wt. % vinyltri-$C_{1-4}$ alkoxysilane copolymerized or grafted and having a melt index from 0.1 to 50 g/10 min.
2. The composition of claim 1 wherein the modified polyolefin (b) is an ethylene or propylene homopolymer or copolymer grafted with maleic anhydride.
3. The composition of claim 2 wherein the modified polyolefin (b) is polyethylene grafted with maleic anhydride.
4. The composition of claim 3 wherein the modified polyolefin (b) is HDPE having a density greater than 0.94 g/cm$^3$ grafted with 1 to 3 wt. % maleic anhydride.
5. The composition of claim 3 wherein the modified polyolefin (b) is LLDPE having a density up to 0.939 g/cm$^3$ grafted with 1 to 3 wt. % maleic anhydride.
6. The composition of claim 1 wherein the base resin (a) is a mixture of a highly crystalline polyolefin resin and an elastomeric polyolefin resin present at a weight ratio of from 15:1 to 1:1.
7. The composition of claim 6 wherein the crystalline polyolefin resin is polyethylene resin.

8. The composition of claim 8 wherein the crystalline polyolefin is LLDPE, HDPE or a mixture thereof.

9. The composition of claim 6 wherein the elastomeric polyolefin resin is EPR or EPDM.

10. The composition of claim 6 wherein the elastomeric polyolefin resin is polyisobutylene.

11. The composition of claim 1 wherein the alkoxysilane is vinyltrimethoxysilane.

12. The composition of claim 1 wherein the alkoxysilane is vinyltriethoxysilane.

13. The composition of claim 1 wherein the modified ethylene polymer (c) is HDPE grafted with 0.5 to 7.5 wt. % vinyltrimethoxysilane.

14. The composition of claim 1 wherein the modified ethylene polymer (c) is HDPE grafted with 0.5 to 7.5 wt. % vinyltriethoxysilane.

15. The composition of claim 1 wherein the modified ethylene polymer (c) is a copolymer of ethylene and 0.5 to 7.5 wt. % vinyltrimethoxysilane.

16. The composition of claim 1 wherein the modified ethylene polymer (c) is a copolymer of ethylene and 0.5 to 7.5 wt. % vinyltriethoxysilane.

17. The composition of claim 1 additionally containing 50 to 10000 ppm of an adhesion promotor selected from the group consisting of organic bases, carboxylic acids and organometallic compounds.

18. The composition of claim 17 wherein the adhesion promotor is a carboxylate of a metal selected from the group consisting of lead, cobalt, iron, nickel, zinc and tin.

19. The composition of claim 18 wherein the adhesion promotor is a tin carboxylate.

20. The composition of claim 19 wherein the adhesion promotor is dibutyltin dilaurate.

21. The composition of claim 17 wherein the adhesive blend contains 75 to 92 wt. % base resin (a), 4 to 20 wt. % modified polyolefin (b), 4 to 12 wt. % modified ethylene polymer (c) and 100 to 3000 ppm adhesion promotor.

22. The composition of claim 21 wherein the base resin (a) is a mixture of polyethylene and an elastomeric resin selected from the group consisting of EPR, EPDM and polyisobutylene, the weight ratio of polyethylene to elastomeric resin in the range from 10:1 to 1.5:1, the modified polyolefin (b) is polyethylene grafted with 1 to 3 wt. % maleic anhydride, the modified ethylene polymer (c) has 0.5 to 7.5 wt. % vinyltrimethoxysilane copolymerized or grafted and the adhesion promoter is dibutyltin dilaurate.

23. An adhesive composition comprising:
  (a) 65 to 95.5 wt. % polyolefin base resin having a melt index of 0.1 to 100 g/10 min. and selected from the group consisting of ethylene homopolymers, copolymers of ethylene with $C_{3-8}$ α-olefins, vinyl carboxylates and alkyl acrylates, terpolymers of ethylene and propylene with diene monomers, polyisobutylene, and copolymers of isobutylene and isoprene;
  (b) 2.5 to 25 wt. % modified HDPE or LLDPE grafted with 0.5 to 4 wt. % maleic anhydride and having a melt index from 0.5 to 50 g/10 min; and
  (c) 2 to 20 wt. % modified ethylene polymer having a melt index from 0.1 to 50 and selected from the group consisting of HDPE grafted with 0.5 to 7.5 wt. % vinyltrimethoxysilane or vinyltriethoxysilane and copolymers of ethylene and 0.5 to 7.5 wt. % vinyltrimethoxysilane or vinyltriethoxysilane.

24. The adhesive composition of claim 23 which contains 75 to 92 wt. % base resin (a), 4 to 20 wt. % modified HDPE or LLDPE (b), 4 to 12 wt. % modified ethylene polymer (c) and 100 to 3000 ppm dibutyltin dilaurate.

\* \* \* \* \*